United States Patent
Fleisher

(10) Patent No.: US 10,003,662 B1
(45) Date of Patent: Jun. 19, 2018

(54) ADAPTABLE BROKER FOR LOCATION BASED SECOND DEGREE SOCIAL NETWORKING

(71) Applicant: Two Degrees, Inc., Boca Raton, FL (US)

(72) Inventor: Steven Fleisher, Delray Beach, FL (US)

(73) Assignee: TWO DEGREES, INC., Boca Raton, FL (US)

( * ) Notice: Subject to any disclaimer, the term of this patent is extended or adjusted under 35 U.S.C. 154(b) by 0 days. days.

(21) Appl. No.: 15/446,117

(22) Filed: Mar. 1, 2017

(51) Int. Cl.
*H04W 24/00* (2009.01)
*H04L 29/08* (2006.01)
*H04W 4/20* (2018.01)
*H04W 4/02* (2018.01)
*H04W 12/06* (2009.01)

(52) U.S. Cl.
CPC ............ *H04L 67/18* (2013.01); *H04L 67/306* (2013.01); *H04W 4/023* (2013.01); *H04W 4/206* (2013.01); *H04W 12/06* (2013.01)

(58) Field of Classification Search
CPC .. H04W 4/02; H04W 64/00; H04W 29/08657
USPC ..... 455/412.1–414.3, 456.1–456.3, 457, 466
See application file for complete search history.

(56) References Cited

U.S. PATENT DOCUMENTS

| | | | |
|---|---|---|---|
| 8,108,501 B2 * | 1/2012 | Birnie ...................... | H04W 4/02 455/456.1 |
| 2011/0034182 A1 * | 2/2011 | Issa ......................... | H04W 4/02 455/456.3 |
| 2011/0119230 A1 * | 5/2011 | Zuber ................ | G06F 17/30011 707/608 |
| 2011/0159890 A1 * | 6/2011 | Fortescue .............. | G06Q 30/02 455/456.2 |
| 2012/0231781 A1 * | 9/2012 | Kumar ................ | G06Q 30/0201 455/422.1 |
| 2014/0082073 A1 * | 3/2014 | Wable .................... | H04L 67/306 709/204 |
| 2014/0128103 A1 * | 5/2014 | Joao ....................... | H04W 4/206 455/456.3 |
| 2014/0349625 A1 * | 11/2014 | Edwards ................. | H04L 51/12 455/414.1 |
| 2015/0271638 A1 * | 9/2015 | Menayas ............... | H04W 4/021 455/456.3 |

(Continued)

*Primary Examiner* — Dai A Phuong
(74) *Attorney, Agent, or Firm* — Steven M. Greenberg, Esq.; CRGO Law

(57) ABSTRACT

A method for adaptably brokering location based second degree social networking includes receiving in a broker from a mobile computing device a request indicating a geo-location of the device, an identification of a social networking member, and a listing of one or more social networks in a set of social networks. Then, the broker queries each social network in the set to identify first degree contacts of the social networking member and additionally queries each social network in the set to identify second degree contacts of the social networking member. Thereafter, the second degree contacts is geo-located and, on condition that one of the second degree contacts is determined to be geographically proximate to the geo-location of the device, a profile for the one of the second degree contacts is retrieved from one or more of the social networks in the set and transmitted to the device.

18 Claims, 2 Drawing Sheets

(56) References Cited

U.S. PATENT DOCUMENTS

| | | | |
|---|---|---|---|
| 2016/0094963 A1* | 3/2016 | Gupta | H04W 4/206 705/7.19 |
| 2016/0135014 A1* | 5/2016 | Alharayeri | H04L 67/306 455/456.3 |
| 2016/0150065 A1* | 5/2016 | Waltermann | H04M 3/42382 455/569.1 |
| 2016/0150072 A1* | 5/2016 | Rangarajan | H04W 4/003 455/574 |
| 2016/0239814 A1* | 8/2016 | Bianchi | G06Q 20/10 |
| 2017/0359296 A1* | 12/2017 | Wiseman | G06F 9/4451 |
| 2017/0359428 A1* | 12/2017 | LeBeau | G06Q 50/01 |

* cited by examiner

ADAPTABLE BROKER FOR LOCATION BASED SECOND DEGREE SOCIAL NETWORKING

BACKGROUND OF THE INVENTION

Field of the Invention

The present invention relates to social networking and more particularly to geo-locating related contacts in a social network.

Description of the Related Art

A social network is a network of social interactions and personal relationships. Often embodied in the form of a dedicated Web site or other computer program, a social networking system enables each member to communicate with others in the social network by posting online information for viewing by all or a subset of the contacts or "friends" of the member, comments to the postings of other friends, and messages to other friends and in some instances, other members of the social network not yet friends with the member. Presently, social networking systems account for the highest level of participation on the Internet of all other systems present on the Internet.

Part and parcel of the social network is the ability of the end user to monitor the latest postings by way of a mobile device. Indeed, more people engage in social networking through respective mobile devices than through any other mode of access including a desktop computer. Unique to the mobile device, however, is the notion of geo-location. Geo-location is the process or technique of identifying the geographical location of a person or device by means of digital information processed via the Internet. Typically, geo-location is performed through the use of on-board global positioning system (GPS) circuitry, though some devices rely upon geographic positioning data embedded in requests and responses exchanged between Web sites and Web browsers operating in corresponding devices.

In the context of social networking, geo-location is used to suggest to a member of the social network a location for association with a posting onto the social network, for example a contemporaneous location where the member has "checked in" or where the member has captured an image selected for inclusion in a posting onto the social network. As well, geo-location is used in social networking as a medium of targeted marketing in which an advertiser advertising through the social network pushes marketing content to the mobile device of a member of the social network that is geographically relevant to a detected geographic location of the member of the social network. Finally, geo-location is used in social network to provide notice to a member of a social network when a first degree contact or "friend" is geographically proximate to a geographic position of the contact or "friend".

Tools adapted for use in a social network that support geo-location of the members of the social network can be technically sophisticated and often are deployed by the publisher of the social network through access internally to the program code of the social network. However, third parties also have developed add-ons to social networks to provide geo-location functionality through access externally to an application programming interface (API) of the social network published by the publisher of the social network. In that latter instance, the third party tool must be specifically adapted to the target social network to the exclusion of other social networks. Accordingly, costly infrastructure is required for the third party developer seeking to enhance the functionality of multiple different social networks through the provision of a geo-location based add-on.

BRIEF SUMMARY OF THE INVENTION

Embodiments of the present invention address deficiencies of the art in respect to geo-locating members of a social network and provide a novel and non-obvious method, system and computer program product for an adaptable broker for location based second degree social networking. In an embodiment of the invention, a method for adaptably brokering location based second degree social networking includes receiving in a broker from a mobile computing device from over a computer communications network, a request indicating a geo-location of the mobile computing device, an identification of a social networking member, and a listing of one or more social networks in a set of social networks.

Thereafter, the broker queries each social network in the set on behalf of the social networking member to identify first degree contacts of the social networking member. As well, the broker additionally queries each social network in the set on behalf of the social networking member to identify second degree contacts of the social networking member. The second degree contacts are then geo-located by the broker. On condition that one of the second degree contacts is determined to be geographically proximate to the geo-location of the mobile computing device, the broker retrieves a profile for the one of the second degree contacts from one or more of the social networks in the set and transmits the profile to the mobile computing device.

In one aspect of the embodiment, the profile that is transmitted to the mobile computing device is assembled by the broker as an aggregation of different profiles for the one of the second degree contacts from respectively different ones of the social networks in the set. In another aspect of the embodiment, authentication data for the social networking member for each one of the social networks in the set is retrieved in a table in the broker based upon the identification of the social networking member and utilized in performing the querying of each social network.

Of note, in yet another aspect of the embodiment, the geo-location of the mobile computing device indicates that the social networking member is present in a bar and the one of the second degree contacts is determined to be geographically proximate to the geo-location of the mobile computing device on condition that one of the second degree contacts is geo-located in the bar. In that instance, the broker retrieves in addition to the profile, a list of mutual contacts for the one of the second degree contacts from one or more of the social networks in the set and transmits along with the profile the list of mutual contacts to the mobile computing device.

Of additional note, in even yet another aspect of the embodiment, the geo-location of the mobile computing device indicates that the social networking member is present at a gate in an airport and the one of the second degree contacts is determined to be geographically proximate to the geo-location of the mobile computing device on condition that one of the second degree contacts is geo-located at the gate in the airport. In that instance, the broker retrieves in addition to the profile, a list of mutual contacts for the one of the second degree contacts from one or more of the social networks in the set and transmits along with the profile the list of mutual contacts to the mobile computing device.

In another embodiment of the invention, a data processing system is configured for adaptably brokering location based second degree social networking. The system includes a host computing platform including one or more computers, each with memory and at least one processor. The host computing platform is communicatively coupled to a multiplicity of different social networks over a computer communications network. The host computing platform also is communicatively coupled to a multiplicity of different mobile computing devices over a computer communications network.

Importantly, a broker executes in the memory of the host computing platform. The broker includes program code that when executes in the memory of the host computing platform, receives from one of the mobile computing devices from over the computer communications network, a request indicating a geo-location of the one of the mobile computing devices, an identification of a social networking member, and a listing of one or more of the social networks in a set of social networks, queries each of the social networks in the set on behalf of the social networking member to identify first degree contacts of the social networking member and additionally queries each of the social networks in the set on behalf of the social networking member to identify second degree contacts of the social networking member, geo-locates the second degree contacts, and, on condition that one of the second degree contacts is determined to be geographically proximate to the geo-location of the one of the mobile computing devices, retrieves from one or more of the social networks in the set a profile for the one of the second degree contacts and transmits the profile to the one of the mobile computing devices.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for adaptably brokering location based second degree social networking. In accordance with an embodiment of the invention, a geo-location request is received in a broker from a mobile computing device from over a computer communications network. The request specifies an identity of social networking member, a set of one or more social networks and a geographic location of the mobile computing device. The broker then identifies authentication data for the social networking member for each of the social networks in the set and authenticates into each of the social networks in the set using the authentication data. Thereafter, the broker issues a query into each of the social networks to identify first degree contacts in each of the social networks for the social networking member and additionally, the broker issues a query into each of the social networks to identify a listing of members who are the first degree contacts of each of the identified first degree contacts of the social networking member—the second degree contacts of the social networking member. Finally, the broker retrieves geo-location data for each of the second degree contacts and, for each of the second degree contacts determined to be geographically proximate to the social networking member, the broker transmits to the mobile computing device a corresponding profile of the geographically proximate second degree contact.

Figure 1:
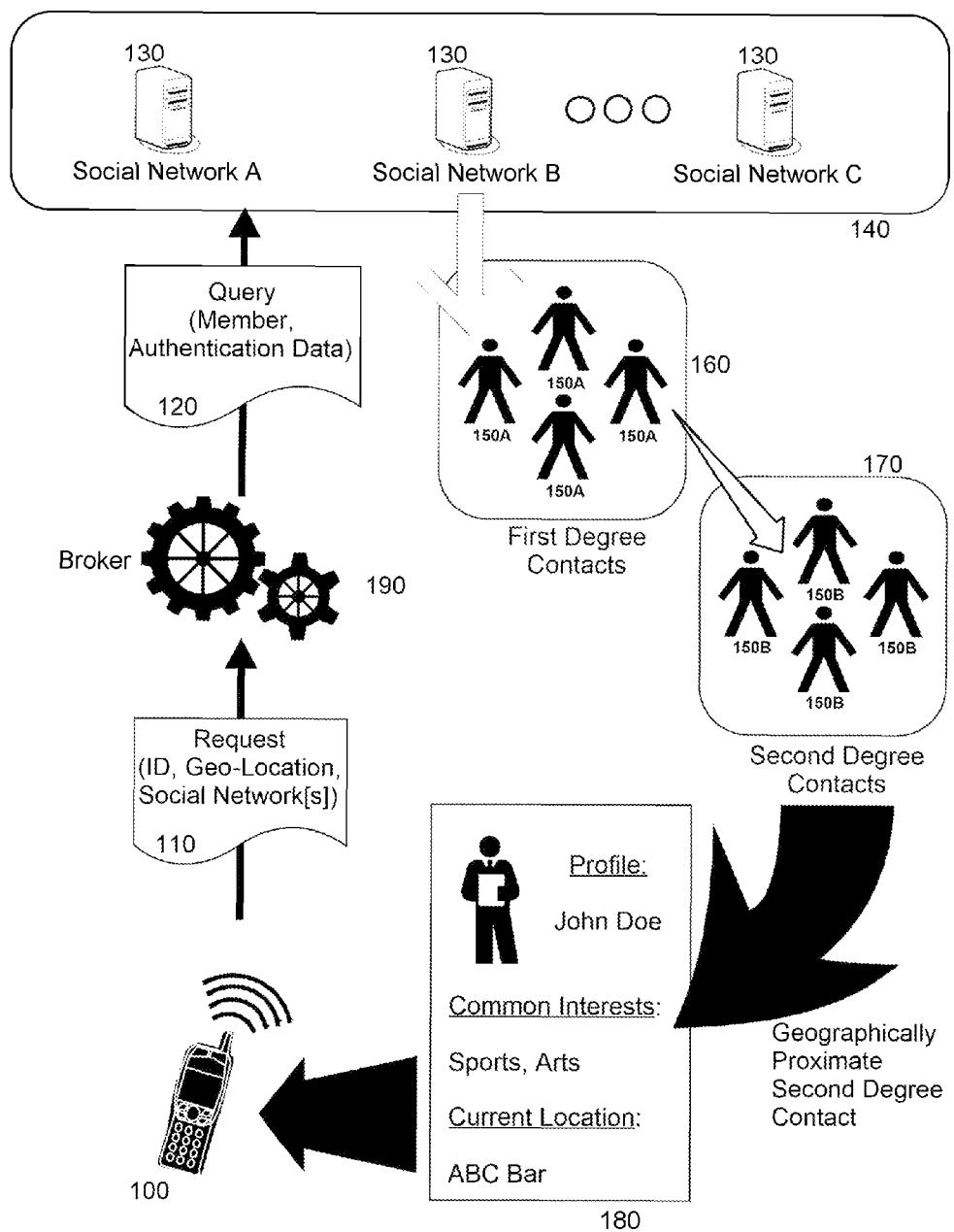
FIG. 1 is a pictorial illustration of a process for adaptably brokering location based second degree social networking.

In further illustration, FIG. 1 is a pictorial illustration of a process for adaptably brokering location based second degree social networking. As shown in FIG. 1, a broker 190 receives a request 110 from mobile computing device 100. The request 110 includes an identification of a corresponding individual, a geo-location of the mobile computing device 100, and a list of one or more social networks 130 in a set 140 of social networks. The broker 190 then generates and issues a query 120 (with authentication data for the individual) to each of the social networks 130 in the set 140 to identify first degree contacts of the individual. In response, each of the social networks 130 returns a listing 160 of first degree contacts 150A. Then, the broker 190 identifies the first degree contacts 150B of one or more of the first degree contacts 150A in the listing 160—the second degree contacts 170 of the individual.

Once the second degree contacts 170 have been identified, one of the second degree contacts 170 determined to be geographically proximate to the geo-location of the mobile computing device 100 is selected. One or more of the social networks 130 in the set are then queried in order to retrieve a corresponding profile 180 of the one of the second degree contacts 170 known to be geographically proximate to the mobile computing device 100. Optionally, the profile 180 can be assembled as an aggregation of profile data retrieved from the different social networks 130 in the set. Finally, the broker 190 transmits the profile 180 to the mobile computing device 100 for viewing by the individual.

Of note, the foregoing process may be embodied in several different aspects. In one aspect, the mobile computing device 100 is geo-located in a hotel, bar or restaurant or concert venue. The one of the second degree contacts 170 is determined to be geographically proximate to the mobile computing device 100 only if the one of the second degree contacts 170 is geo-located in the same hotel, bar or restaurant or concert venue. In this way, "friends of friends" may spontaneously meet one another.

In another aspect, the mobile computing device 100 is geo-located in at a gate area of an airport. The one of the second degree contacts 170 is determined to be geographically proximate to the mobile computing device 100 only if the one of the second degree contacts 170 is geo-located in the gate area. In this way, individuals of common business interest may spontaneously meet one another for the purpose of business networking while traveling to a same location from an airport. Optionally, seating on a common aircraft for each of the individuals can be retrieved and an option to relocate seating provided in the mobile computing device 100 should a seat on the common aircraft adjacent to one of the individuals be known to be vacant.

Figure 2:
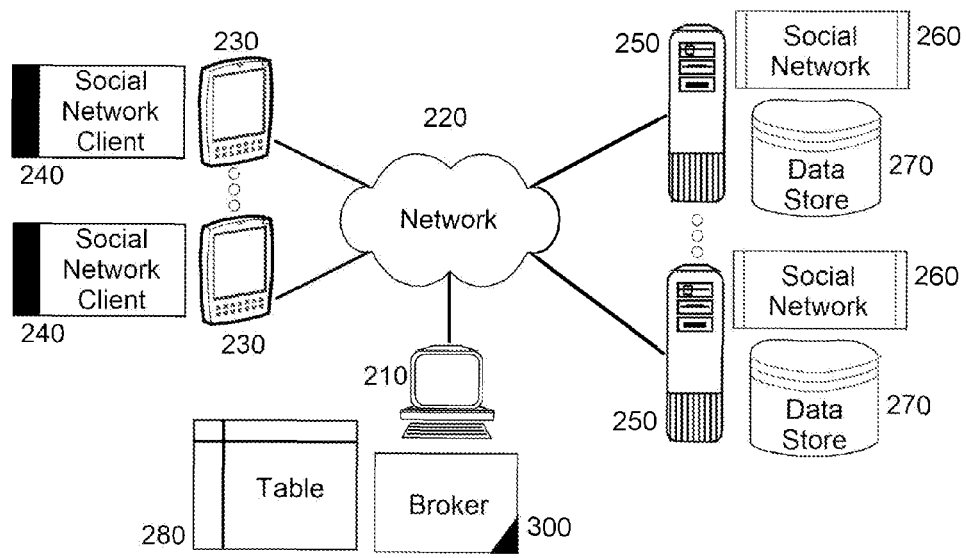
FIG. 2 is a schematic illustration of a data processing system configured as an adaptable broker for location based second degree social networking; and, FIG. 3 is a flow chart illustrating a process for adaptably brokering location based second degree social networking.

The process described in connection with FIG. 1 may be implemented in a data processing system. In yet further illustration, FIG. 2 schematically shows a data processing system configured as an adaptable broker for location based second degree social networking. The system includes a host computing platform 210 that includes one or more computers, each with memory and at least one processor. The host computing platform 210 is communicatively coupled to different servers 250 over computer communications network 220, each of the servers 250 supporting the publication of a corresponding social network 260 and providing access to social network data including contact lists of different members of the social network 260 in data store 270.

The host computing platform 210 additionally is communicatively coupled to different mobile computing devices 230 over the computer communications network 220. Each of the mobile computing devices 230 supports access to the social networks 260 by way of corresponding social networking clients 240 which may range from mobile applications specifically configured to access respective ones of the social networks 260, to Web browsers through which access to the respective ones of the social networks 260 may be achieved. Each of the mobile computing devices 230 additionally is registered with broker 300 and provides to the broker 300 for storage in the host computing platform 210, a listing of first degree contacts of a corresponding end user. Optionally, periodically, the broker 300 synchronizes the listing of first degree contacts for each of the corresponding end users registered with the broker 300.

In this regard, the broker 300 executes in the memory of the host computing platform 210. The broker 300 includes computer program code that during execution in the memory of the host computing platform 210, is enabled to receive from each of the different mobile computing devices 230, a request indicating an identification of a corresponding end user who is a member of one or more of the social networks 260, a geo-location of a corresponding one of the mobile computing devices 230, and a listing of one or more of the social networks 260. The program code is further enabled to respond to each request by locating in table 180 authentication data for each of the social networks 260 in the listing for the corresponding end user.

Subsequent to authentication of the end user in a specified one of the listed social networks 260 in response to a received request, the program code of the broker 300 queries the specified one of the social networks 260 to ultimately identify the second degree contacts of the end user—the first degree contacts of the first degree contacts of the end user acquired either by way of a listing of first degree contacts in each of the social networks 260, or by way of the stored listing of first degree contacts in the broker 300. Optionally, the broker 300 may omit from the querying those of the first degree contacts found in the listing of the end user in the broker 300 when those first degree contacts already have been considered in respect to a listing of first degree contacts in the specified one of the social networks 260.

The broker 300 even yet further is enabled to determine which of the identified second degree contacts are geographically proximate to a corresponding one of the mobile computing devices 230. In the event that one of the second degree contacts of the social networking member is determined to be geographically proximate to a corresponding one of the mobile computing devices 230, profile information for the geographically proximate second degree contact is assembled and transmitted to the corresponding one of the mobile computing devices 230.

Figure 3:
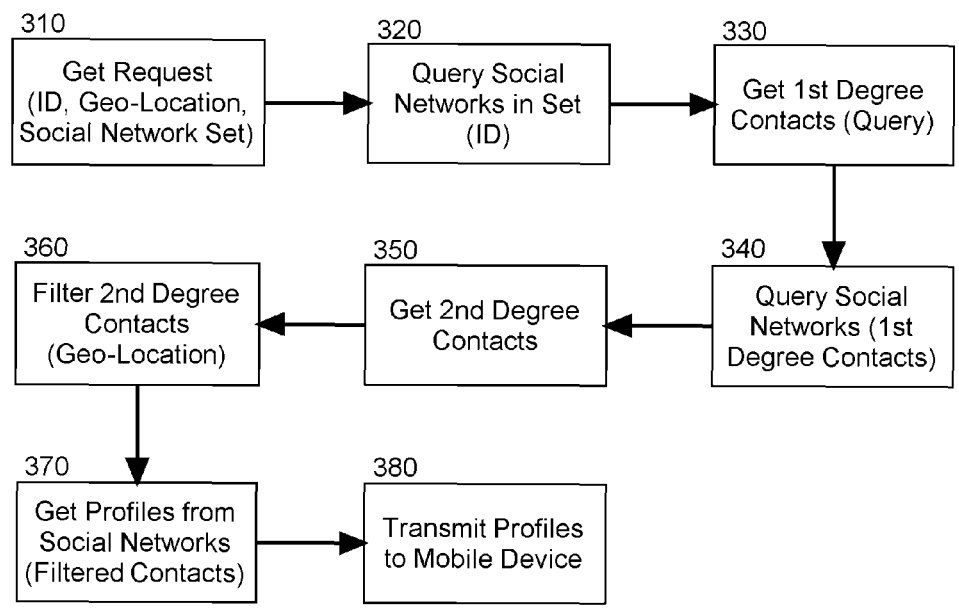

In even yet further illustration of the operation of the broker 300, FIG. 3 is a flow chart illustrating a process for adaptably brokering location based second degree social networking. Beginning in block 310, a request is received from a mobile computing device of a corresponding social networking member. The request includes an identification of the social networking member, along with a geo-location of the corresponding mobile computing device and a listing of one or more social networks to which the social networking member belongs. In block 320, each of the social networks in the listing is queried with an identity of the social networking member in order to retrieve in block 330, the first degree contacts of the social networking member. Then, in block 340, each of the social networks is queried with the identities of the first degree contacts in order to retrieve in block 350, the second degree contacts of the social networking member.

In block 360, the second degree contacts are then filtered in accordance with the geographic proximity of each of the second degree contacts to the geo-location of the mobile computing device. Then, in block 370 profile information for each geographically proximate one of the second degree contacts are assembled. Finally, in block 380 the profile information for each of the geographically proximate ones of the second degree contacts is transmitted to the mobile computing device for viewing by the social networking member. In this way, advanced second degree contact geo-location services are provided to the end user without requiring the deployment of separate intermediaries for each social network to which a social networking member belongs and without requiring the intrusive modification of each of the social networks to which the social networking member belongs.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for adaptably brokering location based second degree social networking comprising:
   receiving in a broker executing in memory of a computer from a mobile computing device from over a computer communications network, a request indicating a geo-location of the mobile computing device, an identification of a social networking member, and a listing of one or more social networks in a set of social networks;
   querying each social network in the set on behalf of the social networking member to identify first degree contacts of the social networking member and additionally querying each social network in the set on behalf of the social networking member to identify second degree contacts of the social networking member;
   geo-locating the second degree contacts; and,
   on condition that one of the second degree contacts is determined to be geographically proximate to the geo-location of the mobile computing device, retrieving from one or more of the social networks in the set a profile for the one of the second degree contacts and transmitting the profile to the mobile computing device.

2. The method of claim 1, wherein the profile transmitted to the mobile computing device is assembled as an aggregation of different profiles for the one of the second degree contacts from respectively different ones of the social networks in the set.

3. The method of claim 1, wherein authentication data for the social networking member for each one of the social networks in the set is retrieved in a table in the broker based upon the identification of the social networking member and utilized in performing the querying of each social network.

4. The method of claim 1, wherein the geo-location of the mobile computing device indicates that the social networking member is present in a bar and the one of the second degree contacts is determined to be geographically proximate to the geo-location of the mobile computing device on condition that one of the second degree contacts is geo-located in the bar.

5. The method of claim 1, wherein the geo-location of the mobile computing device indicates that the social networking member is present at a gate in an airport and the one of the second degree contacts is determined to be geographically proximate to the geo-location of the mobile computing device on condition that one of the second degree contacts is geo-located at the gate in the airport.

6. The method of claim 1, wherein the geo-location of the mobile computing device indicates that the social networking member is present at a concert venue and the one of the second degree contacts is determined to be geographically proximate to the geo-location of the mobile computing device on condition that one of the second degree contacts is geo-located at the concert venue.

7. A data processing system configured for adaptably brokering location based second degree social networking, the system comprising:
- a host computing platform comprising one or more computers, each with memory and at least one processor and communicatively coupled to a multiplicity of different social networks and a multiplicity of different mobile computing devices over a computer communications network; and,
- a broker executing in the memory of the host computing platform, the broker comprising program code that when executes in the memory of the host computing platform, receives from one of the mobile computing devices from over the computer communications network, a request indicating a geo-location of the one of the mobile computing devices, an identification of a social networking member, and a listing of one or more of the social networks in a set of social networks, queries each of the social networks in the set on behalf of the social networking member to identify first degree contacts of the social networking member and additionally queries each of the social networks in the set on behalf of the social networking member to identify second degree contacts of the social networking member, geo-locates the second degree contacts, and, on condition that one of the second degree contacts is determined to be geographically proximate to the geo-location of the one of the mobile computing devices, retrieves from one or more of the social networks in the set a profile for the one of the second degree contacts and transmits the profile to the one of the mobile computing devices.

8. The system of claim 7, wherein the profile transmitted to the one of the mobile computing devices is assembled as an aggregation of different profiles for the one of the second degree contacts from respectively different ones of the social networks in the set.

9. The system of claim 7, wherein authentication data for the social networking member for each one of the social networks in the set is retrieved in a table in the broker based upon the identification of the social networking member and utilized in performing the querying of each social network.

10. The system of claim 7, wherein the geo-location of the one of the mobile computing devices indicates that the social networking member is present in a bar and the one of the second degree contacts is determined to be geographically proximate to the geo-location of the one of the mobile computing devices on condition that one of the second degree contacts is geo-located in the bar.

11. The system of claim 7, wherein the geo-location of the one of the mobile computing devices indicates that the social networking member is present at a gate in an airport and the one of the second degree contacts is determined to be geographically proximate to the geo-location of the one of the mobile computing devices on condition that one of the second degree contacts is geo-located at the gate in the airport.

12. The system of claim 7, wherein the geo-location of the one of the mobile computing devices indicates that the social networking member is present at a concert venue and the one of the second degree contacts is determined to be geographically proximate to the geo-location of the mobile computing device on condition that one of the second degree contacts is geo-located at the concert venue.

13. A computer program product for adaptably brokering location based second degree social networking, the computer program product comprising a non-transitory computer readable storage medium having program instructions embodied therewith, the program instructions executable by a device to cause the device to perform a method comprising:
- receiving in a broker executing in memory of a computer from a mobile computing device from over a computer communications network, a request indicating a geo-location of the mobile computing device, an identification of a social networking member, and a listing of one or more social networks in a set of social networks;
- querying each social network in the set on behalf of the social networking member to identify first degree contacts of the social networking member and additionally querying each social network in the set on behalf of the social networking member to identify second degree contacts of the social networking member;
- geo-locating the second degree contacts; and,
- on condition that one of the second degree contacts is determined to be geographically proximate to the geo-location of the mobile computing device, retrieving from one or more of the social networks in the set a profile for the one of the second degree contacts and transmitting the profile to the mobile computing device.

14. The computer program product of claim 13, wherein the profile transmitted to the mobile computing device is assembled as an aggregation of different profiles for the one of the second degree contacts from respectively different ones of the social networks in the set.

15. The computer program product of claim 13, wherein authentication data for the social networking member for each one of the social networks in the set is retrieved in a table in the broker based upon the identification of the social networking member and utilized in performing the querying of each social network.

16. The computer program product of claim 13, wherein the geo-location of the mobile computing device indicates that the social networking member is present in a bar and the one of the second degree contacts is determined to be geographically proximate to the geo-location of the mobile computing device on condition that one of the second degree contacts is geo-located in the bar.

17. The computer program product of claim 13, wherein the geo-location of the mobile computing device indicates that the social networking member is present at a gate in an airport and the one of the second degree contacts is determined to be geographically proximate to the geo-location of the mobile computing device on condition that one of the second degree contacts is geo-located at the gate in the airport.

18. The computer program product of claim 13, wherein the geo-location of the one of the mobile computing devices indicates that the social networking member is present at a concert venue and the one of the second degree contacts is determined to be geographically proximate to the geo-location of the mobile computing device on condition that one of the second degree contacts is geo-located at the concert venue.

* * * * *